Nov. 1, 1966   E. JONES   3,282,554
SWIVEL VALVE
Filed May 22, 1963

INVENTOR.
Evan Jones,
BY

United States Patent Office 3,282,554
Patented Nov. 1, 1966

3,282,554
SWIVEL VALVE
Evan Jones, Evanston, Ill., assignor to Henry Valve Company, Melrose Park, Ill., a corporation of Illinois
Filed May 22, 1963, Ser. No. 282,279
2 Claims. (Cl. 251—88)

This invention is directed to improvements in swivel-type valves incorporating basic design features as shown in U.S. Patent 2,470,700.

Swivel valves basically comprise a reciprocatingly rotatable valve stem mounting thereon a relatively rotatable valve head or member which is moved by the stem into and out of engagement with a valve seat. Various improvements have been incorporated in the design of the valve member and the mounting of the same on the stem to provide for extended trouble free operation of the valve. One of the basic purposes is to permit the seal area of the valve member to be reciprocated into and out of engagement with the seal area of the seat and eliminate rotational frictional movement between the engaging seal areas in response to advancing or retracting rotation of the stem and the valve member.

The aforementioned patent illustrates the mounting of the valve member by means of roller-like pins arranged in transverse engagement with the valve stem to permit the valve member to rotate relative thereto. Resilient means are provided for the purpose of normally maintaining the valve member in spaced relation to a thrust shoulder portion of the stem to permit ready relative rotation of the stem when the valve member is first engaged with the seat. The resilient means are overcome by continued advancement of the stem toward the seat to bring about direct contact between the valve member and the thrust shoulder portion of the stem to apply adequate final sealing pressure.

The use of the foregoing type of valve structure in fluid handling systems wherein temperature changes are not uncommon often results in the binding or sticking of the valve member to the stem due basically to the use of dissimilar materials. For example, if the valve member is formed from brass and the stem from stainless steel, the dissimilar coefficients of expansion are responsible for sticking and binding between the normally relatively movable parts under appropriate temperature conditions. Any freezing of the parts intended to be relatively movable defeats the purpose of the valve structure and can result in damage to the sealing surfaces of the valve member and the seat. Ball-type swivel structures such as shown in U.S. Patent 2,848,187 have been devised to overcome this particular problem. While such structures function quite adequately, they are rather elaborate and costly.

It is an object of the invention to provide a new and improved form of swivel valve incorporating improvements in design which eliminate the problem of dissimilar material interference during use under adverse temperature conditions.

A further object is to provide a new and improved swivel-type valve member in a valve assembly, the member including as a part thereof a specially arranged and selected bearing member adapted for final valve sealing thrust engagement by the valve stem, the bearing member being selected and arranged to accommodate the use of dissimilar materials in the forming of the valve member and stem and prevent sticking or freezing therebetween during operative use of the valve assembly under relatively high temperature conditions.

Still another object is to provide a new and improved swivel-type valve structure of the nature set forth in the foregoing objects, the structure retaining advantageous use of a known and uncomplicated form of relatively rotatable valve member mounting means while providing in an uncomplicated and efficient manner an anti-sticking arrangement which prevents freezing or fixing of the valve member relative to the stem during use under variable temperature conditions.

Other objects not specifically set forth will become apparent from the following detailed description of the invention made in conjunction with the accompanying drawings wherein.

Figure 1:
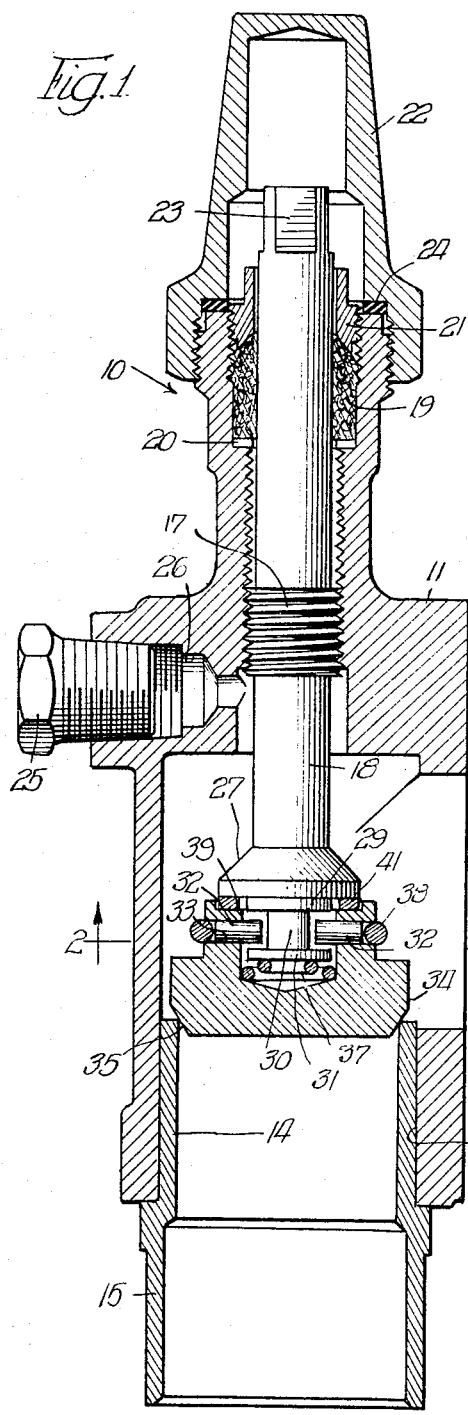
FIG. 1 is a vertical section of a valve structure including the improvements of the invention.

The valve 10 of FIG. 1 is especially adapted for use in a refrigeration system as a compressor valve to control the flow of hot gaseous refrigerant through a portion of the system. The valve basically includes a housing or body portion 11 provided with a side opening 12 for suitable attachment with a tube (not shown) constituting a part of a refrigerant flow line. The valve body portion includes a bottom opening 13 in which is received a combination valve seat and adaptor member in the form of a tube provided with a smaller diameter upper end portion 14 the top edge of which defines the valve seat, and a lower larger diameter projecting adaptor portion 15 in which a suitable tube (not shown) constituting a refrigerant flow line can be inserted and fixed. The valve body portion 11 includes an upwardly elongated neck portion and a vertical valve stem bore 16 extending continuously therethrough and including a threaded portion cooperating with a threaded area 17 of a valve stem 18 received in the bore. A suitable packing 19 is received in the bore about the upper end portion of the valve stem and is retained between a washer 20 and a threaded gland 21. A removable cap 22 is suitably mounted about the upper exposed end of the stem and threaded on the body portion 11. The upper end of the stem is formed with flatted surfaces 23 to receive thereon a handwheel (not shown) upon removal of the cap 22 to thereby rotate the valve stem 18 and reciprocatingly advance or retract the same by means of the cooperating threads of the stem and body portion. As shown in FIG. 1, the stem 18 is advanced downwardly toward the valve seat to its fullest extent and the valve is tightly closed. A suitable gasket 24 may be located between the cap and the valve body portion 11 and a removable plug 25 seals off a tapping port 26 formed in the body portion 11 adjacent the end of the bore 16 to permit refrigerant withdrawal for testing or the like without valve disconnection from the refrigerant flow lines.

Figure 3:
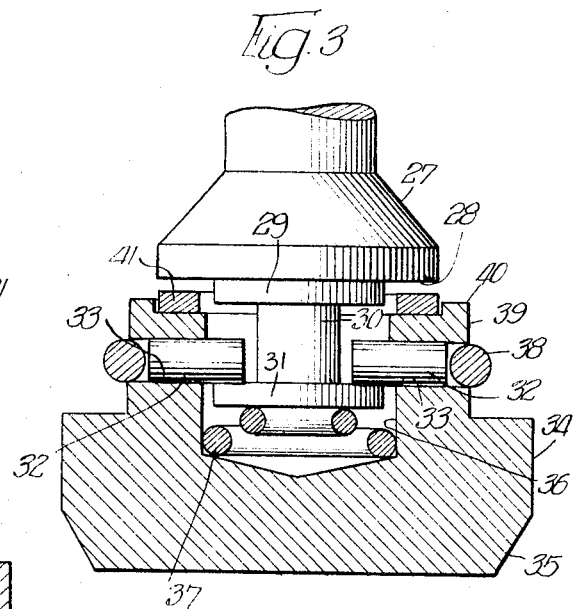
FIG. 3 is an enlarged fragmentary section of the valve member and its connection with the valve stem.
Figure 2:
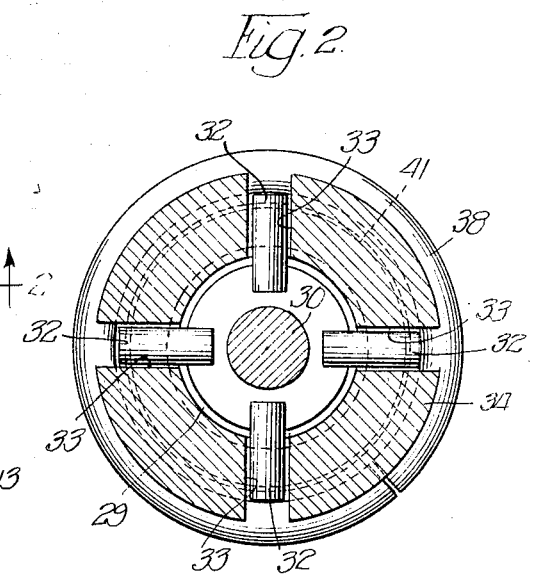
FIG. 2 is an enlarged transverse section of the interconnecting parts of the valve member and the stem as viewed generally along line 2—2 in FIG. 1.

Referring particularly to FIGS. 2 and 3, the lower end of the stem 18 is formed with an outwardly flared frusto-conical thrust shoulder portion 27 defining an annular radially extending thrust surface 28. Beyond the surface 28 the stem includes an annular shoulder portion 29 of a diameter corresponding generally to the diameter of the main portion of the stem, a downwardly extending spindle portion 30 of reduced diameter and a bottom annular flange portion 31 of a diameter greater than the spindle portion 30 and somewhat less than the diameter of the shoulder portion 29. The flange portion 31 constitutes a spring seat on the lower face thereof and along the upper annular face thereof engages a plurality of radially projecting, circumferentially spaced roller-like pins 32 which extend through suitable radially extending apertures or bores 33 formed in the upper portion of a valve head or member 34. This valve member includes an upper portion of reduced diameter and a lower portion of substantial area having a lower circumferentially continuous bevel-like sealing surface 35 adapted for sealing engagement with the top surface of the upper portion 14 of the valve seat and adaptor tube fixed in the body portion 11.

The valve member 34 is formed with a central bore 36 extending downwardly from the top surface thereof but terminating short of the bottom surface thereof and receiving therein a conical spring 37 seated between the base of the bore and the bottom surface of the shoulder portion 31 of the stem 18. The radial bores 33 communicate with the central bore 36 and the pins 32 project inwardly into overlapping relation with the shoulder portion 31. A split ring 38 extends about the outer surface of the upper reduced portion of the valve member 34 in covering relation with the radial bores 33 to hold the pins 32 therein. The top surface of the valve member is formed with an annular recess 39 spaced inwardly of the outer periphery of the valve member to define an upstanding, circumferentially continuous shoulder 40. The recess 39 is in direct radial communication with the central bore 36 and receives therein an annular ring-type washer 41 constituting a bearing member.

The valve 10 operates in the known manner with the coil spring 37 functioning normally to urge the valve member downwardly as limited by engagement of the shoulder portion 31 with the pins 32 thus maintaining the valve member and the elements carried thereby in axially spaced relation from the thrust surface 28 of the stem 18. This spacing is illustrated in FIG. 3 and permits ready relative rotation between the stem 18 and the valve member 34. The axial spacing is maintained when the valve member 34 is out of engagement with the valve seat. Upon the closing of the valve and initial contact between the valve member 34 and valve seat, downward rotating movement of the stem 18 continues with the stem when rotating relative to the valve member 34 by reason of the roller-type pins 32. In this manner the initial friction established upon contact with the valve seat prevents further rotation of the valve member thus avoiding scoring of the engaged sealing surfaces. The spring 37 functions to prevent chattering during valve closing and opening and further downward movement of the stem ultimately brings about contact between the thrust surface 28 and the bearing washer 41. Final tight engagement as shown in FIG. 1 results in compression of the spring 37 to permit closure between the stem and the valve member and tight engagement between the thrust surface 28 and the bearing washer 41 to ultimately tighten the valve member against the valve seat to totally cut off fluid flow.

In the tightly closed position of the valve as shown in FIG. 1, a substantial thrust or bearing force exists between the frusto-conical portion 27 of the stem and the valve member 34. For efficient sealing action the valve member 34 is preferably formed from brass or other somewhat softer material whereas the stem 18 and its various parts, including the frusto-conical thrust portion 27, is formed from harder stainless steel. With these dissimilar materials exhibiting different coefficients of expansion it has been found that a binding or sticking develops between the tightly engaged surfaces of the stem and valve member. To overcome this problem, the bearing washer 41 is provided as a part of the valve member 34 and is formed from the same material as that of the stem 18. Accordingly, the bearing washer 41 is formed from stainless steel and is preferably somewhat loosely received in the annular recess 39 within the annular shoulder 40. FIG. 3 illustrates a slight clearance between the outer periphery of the washer 41 and the inner periphery of the shoulder 40, this clearance being somewhat exaggerated for purposes of illustration. With this arrangement the fluid heat functions to bring about substantially identical or similar expansion of the bearing washer 41 and stem 18. However, the valve member 34 expands at its own rate in response to the fluid heat and the particular structural arrangement eliminates any interference as a result of a dissimilar rate and extent of expansion of the parts thus preventing sticking or freezing of the parts.

The inner periphery of the bearing washer 41 is unconfined by reason of the recess 39 extending into direct radial communication with the central bore 36 of the valve member 34. Furthermore, the particular manner in which the bearing washer 41 is mounted on the valve member permits expansion and contraction thereof independently of the valve member while still functioning mechanically as a part thereof. The thrust surface 28 tightly engages the top surface of the bearing washer 41 in the closed position of the valve and these engaging parts expand and contract at substantially equal rates without binding or freezing. Furthermore, the use of the harder stainless steel material in forming the bearing washer 41 permits high polishing of at least the top surface thereof for engagement with the thrust surface 28 thus eliminating any galling and providing a very smooth, virtually friction-free engagement. Thus by providing for engagement between highly polished surfaces 28 and the top surface of the bearing washer 41, a low coefficient of friction is established between these surfaces and subsequent retraction of the stem permits ready relative movement between the stem and valve member without accompanying scoring or damaging of the engaging sealing surfaces.

The particular structural arrangement described accommodates loose mounting of the bearing washer 41 as desired. In this respect the washer 41 is of a thickness which is greater than the depth of the recess 39 so that the washer projects upwardly therefrom, this thickness also being greater than the distance of axial separation between the valve member 34 and thrust surface 28 of the stem 18. Therefore, during reciprocation of the stem and valve member accompanied by axial spacing of the valve member on the stem as shown in FIG. 3, the bearing washer 41 will not become undesirably displaced from the assembly.

Obviously certain modifications and variations of the invention as hereinbefore set forth may be made without departing from the spirit and scope thereof, and therefore only such limitations should be imposed as are indicated in the appended claims.

I claim:

1. In a valve wherein a reciprocatingly rotatable valve stem has mounted thereon a relatively rotatable valve member for movement of said valve member into and out of engagement with a valve seat, said valve stem including thrust means axially engaging said valve member in the valve seat engaging position of said valve member, said thrust means and valve member being formed from dissimilar materials exhibiting different coefficients of expansion, the improvement comprising the provision of a bearing member on said valve member in opposed relation to said thrust means for engagement solely therewith in the valve seat engaging position of said valve member, said bearing member being formed from material similar to the material of said thrust means and exhibiting a similar coefficient of expansion, said bearing member being in the form of a washer relatively loosely mounted in a recess in said valve member for variable expansion and contraction relative thereto, the thickness of said washer being greater than the depth of said recess to project therefrom and being greater than the greatest axial distance between said thrust means and washer at any reciprocated position of said valve stem.

2. In a valve wherein a reciprocatingly rotatable valve stem has mounted thereon a relatively rotatable valve member for movement of said valve member into and out of engagement with a valve seat, said valve stem including thrust means axially engaging said valve member in the valve seat engaging position of said valve member, said thrust means and valve member being formed from dissimilar materials exhibiting different coefficients of expansion, the improvement comprising the provision of a bearing member on said valve member in opposed relation to said thrust means for engagement solely therewith in the valve seat engaging position of said valve member, said bearing member being formed from material similar to the material of said thrust means and exhibiting a similar coefficient of expansion, said bearing member being in the form of a washer relatively loosely mounted in a recess in said valve member for variable expansion and contraction relative thereto, the thickness of said washer being greater than the depth of said recess to project therefrom and being greater than the greatest axial distance between said thrust means and washer at any reciprocated position of said valve stem, the surface of said washer arranged for engagement with said thrust means being smoothly polished to reduce friction developed during engaged relative rotation.

References Cited by the Examiner

UNITED STATES PATENTS

| | | | |
|---|---|---|---|
| 1,392,354 | 10/1921 | Reiley | 251—88 |
| 2,470,700 | 5/1949 | Henry | 251—85 |

M. CARY NELSON, *Primary Examiner.*

A. ROSENTHAL, *Assistant Examiner.*